(12) United States Patent
Clark

(10) Patent No.: US 11,442,776 B2
(45) Date of Patent: Sep. 13, 2022

(54) EXECUTION JOB COMPUTE UNIT COMPOSITION IN COMPUTING CLUSTERS

(71) Applicant: Liqid Inc., Broomfield, CO (US)

(72) Inventor: Josiah Clark, Reston, VA (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 17/119,165

(22) Filed: Dec. 11, 2020

(65) Prior Publication Data
US 2022/0188158 A1      Jun. 16, 2022

(51) Int. Cl.
| | |
|---|---|
| G06F 9/46 | (2006.01) |
| G06F 9/48 | (2006.01) |
| G06F 9/50 | (2006.01) |
| H04L 69/18 | (2022.01) |
| H04L 67/10 | (2022.01) |

(52) U.S. Cl.
CPC .......... *G06F 9/4887* (2013.01); *G06F 9/5038* (2013.01); *H04L 67/10* (2013.01); *H04L 69/18* (2013.01)

(58) Field of Classification Search
CPC .... G06F 9/4887; G06F 9/5038; G06F 3/0607; G06F 2213/0026; G06F 3/0635; G06F 3/0685; G06F 9/451; H04L 67/10; H04L 69/18
See application file for complete search history.

(56) References Cited

U.S. PATENT DOCUMENTS

| | | | |
|---|---|---|---|
| 5,828,207 A | 10/1998 | Saadeh | |
| 6,061,750 A | 5/2000 | Beardsley et al. | |
| 6,208,345 B1 | 3/2001 | Sheard et al. | |
| 6,325,636 B1 | 12/2001 | Hipp et al. | |
| 7,243,145 B1 | 7/2007 | Poortman | |

(Continued)

FOREIGN PATENT DOCUMENTS

| | | |
|---|---|---|
| WO | 2002/065322 A1 | 8/2002 |
| WO | 2018/175352 A1 | 9/2018 |

OTHER PUBLICATIONS

Aragon, Juan L. et al., "Control Speculation For Energy-Efficient Next-Generation Superscalar Processors," IEEE Transactions on Computers, vol. 55, No. 3, pp. 281-291, Mar. 2006.

(Continued)

*Primary Examiner* — Cheikh T Ndiaye

(57) ABSTRACT

Deployment of arrangements of physical computing components coupled over a communication fabric are presented herein. In one example, a method includes receiving execution jobs directed to a computing cluster comprising a pool of computing components coupled to at least a communication fabric. Based on properties of the execution jobs, the method includes determining resource scheduling for handling the execution jobs, the resource scheduling indicating timewise allocations of resources of the computing cluster, and initiating the execution jobs on the computing cluster according to the resource scheduling by at least instructing the communication fabric to compose compute units comprising sets of computing components selected from among the pool of computing components to handle the execution jobs. Responsive to completions of the execution jobs, the compute units are decomposed back into the pool of computing components.

20 Claims, 6 Drawing Sheets

(56) References Cited

U.S. PATENT DOCUMENTS

| | | |
|---|---|---|
| 7,260,487 B2 | 8/2007 | Brey et al. |
| 7,340,578 B1 | 3/2008 | Khanzode |
| 7,505,889 B2 | 3/2009 | Salmonsen et al. |
| 7,606,960 B2 | 10/2009 | Munguia |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,602,437 B1 | 3/2017 | Bemath |
| 10,536,349 B1 | 1/2020 | Hayward |
| 10,652,266 B1 | 5/2020 | Tautschnig et al. |
| 10,728,121 B1 | 7/2020 | Chitalia |
| 10,999,403 B2* | 5/2021 | Watt ................ H04L 43/0852 |
| 2002/0059428 A1 | 5/2002 | Susai et al. |
| 2003/0110423 A1 | 6/2003 | Helms et al. |
| 2003/0126478 A1 | 7/2003 | Bums et al. |
| 2004/0230787 A1 | 11/2004 | Blumenau et al. |
| 2005/0188191 A1 | 8/2005 | Yoshida |
| 2005/0223136 A1 | 10/2005 | Tanaka et al. |
| 2006/0259810 A1 | 11/2006 | Hosoya |
| 2006/0277206 A1 | 12/2006 | Bailey et al. |
| 2007/0067432 A1 | 3/2007 | Tarui et al. |
| 2007/0093916 A1 | 4/2007 | Sanghvi et al. |
| 2008/0034153 A1 | 2/2008 | Lee et al. |
| 2008/0123559 A1 | 5/2008 | Haviv et al. |
| 2008/0198744 A1 | 8/2008 | Menth |
| 2008/0281938 A1 | 11/2008 | Rai et al. |
| 2008/0288877 A1 | 11/2008 | Lalzina et al. |
| 2008/0320121 A1 | 12/2008 | Altaf et al. |
| 2009/0006837 A1 | 1/2009 | Rothman et al. |
| 2009/0044263 A1 | 2/2009 | Lingafelt et al. |
| 2009/0100280 A1 | 4/2009 | Lindsay |
| 2009/0132699 A1 | 5/2009 | Sharma et al. |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0276551 A1 | 11/2009 | Brown et al. |
| 2009/0276773 A1 | 11/2009 | Brown et al. |
| 2010/0049851 A1 | 2/2010 | Garrison et al. |
| 2010/0088467 A1 | 4/2010 | Lee et al. |
| 2010/0100655 A1 | 4/2010 | Dowedeit |
| 2010/0138768 A1 | 6/2010 | Lonkar et al. |
| 2010/0153965 A1* | 6/2010 | Arimilli ................ G06F 9/5066 712/30 |
| 2011/0119423 A1 | 5/2011 | Kishore |
| 2011/0154101 A1 | 6/2011 | Merwe et al. |
| 2011/0289510 A1 | 11/2011 | Lin et al. |
| 2011/0299317 A1 | 12/2011 | Shaeffer et al. |
| 2011/0302349 A1 | 12/2011 | Griggs |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1 | 6/2012 | Flynn et al. |
| 2012/0166699 A1 | 6/2012 | Kumar et al. |
| 2012/0210163 A1 | 8/2012 | Cho |
| 2012/0254597 A1* | 10/2012 | Delling ................ G06F 9/5027 712/E9.045 |
| 2012/0317433 A1 | 12/2012 | Ellis et al. |
| 2013/0132643 A1 | 5/2013 | Huang |
| 2013/0159910 A1 | 6/2013 | Bostic et al. |
| 2013/0185416 A1 | 7/2013 | Larkin et al. |
| 2013/0204933 A1 | 8/2013 | Cardona et al. |
| 2013/0291052 A1 | 10/2013 | Hadar |
| 2013/0346994 A1* | 12/2013 | Chen ................ G06F 9/5044 718/104 |
| 2014/0047166 A1 | 2/2014 | Asnaashar et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0181825 A1* | 6/2014 | He ................ G06F 9/5027 718/102 |
| 2014/0330975 A1 | 11/2014 | Abuelsaad et al. |
| 2014/0331280 A1 | 11/2014 | Porras et al. |
| 2014/0365714 A1 | 12/2014 | Sweere et al. |
| 2015/0007127 A1 | 1/2015 | Baldwin et al. |
| 2015/0026385 A1 | 1/2015 | Egi |
| 2015/0074322 A1 | 3/2015 | Galles |
| 2015/0120479 A1 | 4/2015 | Bastien et al. |
| 2015/0121115 A1 | 4/2015 | Chandra et al. |
| 2015/0186437 A1 | 7/2015 | Molaro |
| 2015/0212755 A1 | 7/2015 | Asnaashar |
| 2015/0254088 A1 | 9/2015 | Chou et al. |
| 2015/0271010 A1 | 9/2015 | Shetty et al. |
| 2015/0304423 A1 | 10/2015 | Satoyama et al. |
| 2015/0373115 A1* | 12/2015 | Breakstone ........ G06F 11/2069 709/217 |
| 2016/0188365 A1* | 6/2016 | Bodas .................. G06F 1/3206 718/102 |
| 2016/0197996 A1 | 7/2016 | Barton et al. |
| 2016/0248631 A1 | 8/2016 | Duchesneau |
| 2017/0054603 A1 | 2/2017 | Kulkarni et al. |
| 2017/0118115 A1 | 4/2017 | Tsuji |
| 2017/0235596 A1 | 8/2017 | Vankadaru et al. |
| 2017/0255584 A1 | 9/2017 | Oh |
| 2018/0004703 A1 | 1/2018 | Sharma et al. |
| 2018/0046338 A1 | 2/2018 | Breakstone et al. |
| 2018/0046509 A1 | 2/2018 | Arata et al. |
| 2018/0046514 A1 | 2/2018 | Breakstone et al. |
| 2018/0069899 A1 | 3/2018 | Lang et al. |
| 2018/0213369 A1 | 7/2018 | Dong et al. |
| 2018/0322081 A1 | 11/2018 | Breakstone et al. |
| 2018/0341619 A1 | 11/2018 | Slik |
| 2019/0108158 A1 | 4/2019 | Kachare et al. |
| 2019/0324820 A1 | 10/2019 | Krishnan et al. |
| 2020/0028800 A1 | 1/2020 | Strathman et al. |
| 2020/0133876 A1 | 4/2020 | Bielski et al. |
| 2020/0174838 A1 | 6/2020 | Li et al. |
| 2020/0218578 A1 | 7/2020 | Long et al. |
| 2020/0242065 A1 | 7/2020 | Cannata et al. |
| 2020/0250787 A1* | 8/2020 | Cheng .................. G06F 9/4881 |
| 2020/0341930 A1 | 10/2020 | Cannata et al. |

OTHER PUBLICATIONS

International Application No. PCT/US2017/046602, International Search Report & Written Opinion, 8 pages, dated Oct. 19, 2017.

International Application No. PCT/US2017/046607, International Search Report & Written Opinion, 7 pages, dated Oct. 23, 2017.

Lu, Yingping et al., "Performance Study of iSCSI-Based Storage Subsystems," IEEE Communications Magazine, pp. 76-82, Aug. 2003.

Chung, I-Hsin et al., "Towards A Composable Computer System," HPC Asia 2018, 11 pages, Jan. 28-31, 2018.

International Application No. PCT/US2020/029697, International Search Report & Written Opinion, 9 pages, dated Jul. 9, 2020.

International Application No. PCT/US2020/029703, International Search Report & Written Opinion, 8 pages, dated Jul. 14, 2020.

Mehta et al. "A model-driven approach to job/task composition in cluster computing;" 2007 IEEE International Parallel and Distributed Processing Symposium. IEEE, Mar. 26, 2007.

International Search Report and Written Opinion for PCT Application No. PCT/US2021/058947, dated Feb. 9, 2022; 11 pages.

* cited by examiner

EXECUTION JOB COMPUTE UNIT COMPOSITION IN COMPUTING CLUSTERS

BACKGROUND

Clustered computing systems have become popular as demand for data storage, data processing, and packet communication handling has increased. Data centers typically include large rack-mounted and network-coupled data storage and data processing systems. These data centers can receive data for storage from external users over network links, as well as receive data as generated from applications that are executed upon processing elements within the data center. Many times, data centers and associated computing equipment can be employed to execute jobs for multiple concurrent users or applications. The jobs include execution jobs which can utilize resources of a data center to process data using central processing units (CPUs) or graphics processing units (GPUs), as well as to shuttle data associated with these resources between temporary and longer-term storage. GPU-based processing has increased in popularity for use in artificial intelligence (AI) and machine learning regimes. In these regimes, computing systems, such as blade servers, can include one or more GPUs along with associated CPUs for processing of large data sets.

However, even in large data centers with rack-mounted equipment, density limitations arise when deploying blade servers or similar types of computing elements. Specifically, each server typically includes a fixed arrangement between a CPU, GPU, and storage elements which are housed in a common enclosure or chassis. When incoming jobs are deployed within the data center, the granularity for computing resources is limited to individual servers. Thus, deployed jobs typically take up one or more servers along with all of the corresponding CPU, GPU, and storage elements of each server, regardless of whether or not the entire resources of the server are actually needed to execute the jobs. To compensate, operators of data centers typically deploy a continually-increasing quantity of servers to accommodate increasing traffic from jobs. This strategy can encounter barriers on required physical space for rack-mounted servers, as well as the large space and cost requirements for environmental climate control systems.

Overview

Deployment of arrangements of physical computing components coupled over a communication fabric are presented herein. In one example, a method includes receiving execution jobs directed to a computing cluster comprising a pool of computing components coupled to at least a communication fabric. Based on properties of the execution jobs, the method includes determining resource scheduling for handling the execution jobs, the resource scheduling indicating timewise allocations of resources of the computing cluster, and initiating the execution jobs on the computing cluster according to the resource scheduling by at least instructing the communication fabric to compose compute units comprising sets of computing components selected from among the pool of computing components to handle the execution jobs. Responsive to completions of the execution jobs, the compute units are decomposed back into the pool of computing components.

In another example, an apparatus includes one or more computer readable storage media and a processing system operatively coupled with the one or more computer readable storage media. Program instructions are stored on the one or more computer readable storage media that, based on being read and executed by the processing system, direct the processing system to at least receive execution jobs directed to a computing cluster comprising a pool of computing components coupled to at least a communication fabric. Based on properties of the execution jobs, the program instructions direct the processing system to determine resource scheduling for handling the execution jobs, the resource scheduling indicating timewise allocations of resources of the computing cluster. The program instructions direct the processing system to initiate the execution jobs on the computing cluster according to the resource scheduling by at least instructing the communication fabric to compose compute units comprising sets of computing components selected from among the pool of computing components to handle the execution jobs, wherein responsive to completions of the execution jobs, the compute units are decomposed back into the pool of computing components.

In yet another example, a system includes a job interface configured to receive execution jobs for handling by the computing system, and a management processor. The management processor configured to form a free pool of computing components coupled to at least a communication fabric. Based on properties of the execution jobs, the management processor is configured to determine resource scheduling for handling the execution jobs, the resource scheduling indicating timewise allocations of resources from the free pool of computing components. The management processor is configured to initiate the execution jobs according to the resource scheduling by at least composing compute units comprising sets of computing components selected from among the pool of computing components to handle the execution jobs. An accordance with the resource scheduling, the management processor is configured to deploy software components to the compute units for running the execution jobs once each of the compute units are formed, and responsive to completions of the execution jobs, decompose the compute units by removing a corresponding logical isolation for the compute units such that computing components of the compute units are made available for composition into additional compute units.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
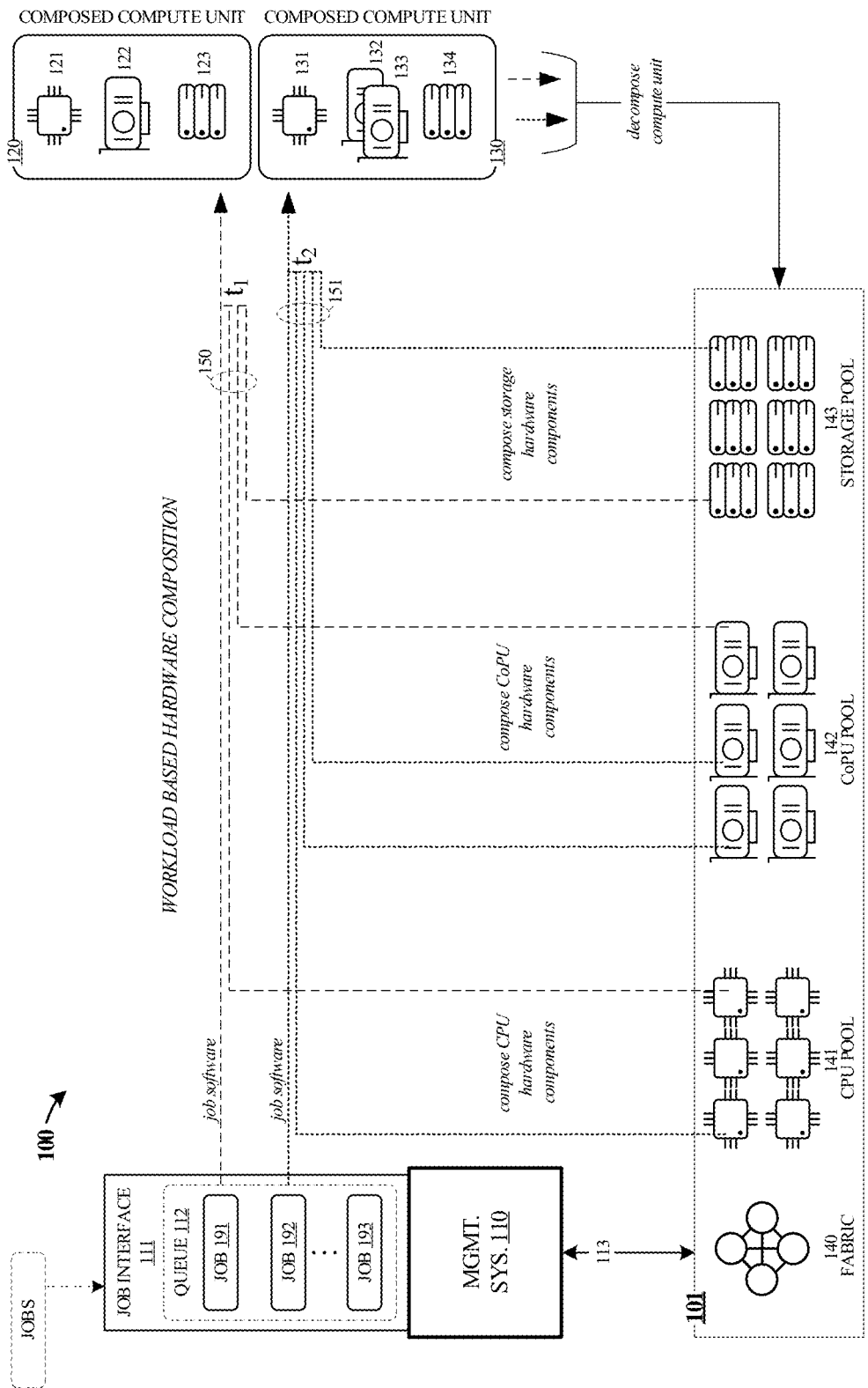
FIG. 1 is a diagram illustrating a computing system in an implementation.

Data centers with associated computing equipment can be employed to execute jobs for multiple concurrent users or applications. The jobs include execution jobs which can utilize resources of a data center to process data as well as to shuttle data associated with these resources between temporary and longer-term storage. Data center processing resources can include central processing units (CPUs) along with various types of co-processing units (CoPUs), such as graphics processing units (GPUs), tensor processing units (TPUs), field-programmable gate arrays (FPGAs), or application-specific integrated circuits (ASICs). Co-processing unit) type of processing has increased in popularity for use in artificial intelligence (AI) and machine learning systems. In the examples herein, limitations of blade server-based data systems can be overcome using disaggregated computing systems which can dynamically compose groupings of computing on-the-fly according to the needs of each incoming execution job. These groupings, referred to herein as compute units or bare metal machines, can include resources which meet the needs of the various execution jobs and are tailored to such jobs. Instead of having a fixed arrangement between a CPU, CoPU, and storage elements, which are housed in a common enclosure or chassis, the examples herein can flexibly include any number of CPUs, CoPUs, and storage elements that span any number of enclosures/chassis and which are dynamically formed into logical arrangements over a communication fabric. Compute units can be further grouped into sets or clusters of many compute units/machines to achieve greater parallelism and throughput. Thus, a data system can better utilize resources by not having idle or wasted portions of a blade server which are not needed for a particular job or for a particular part of a job. A data center operator can achieve very high utilization levels for a data center, greater than can be achieved using fixed-arrangement servers.

Deployment of arrangements of physical computing components coupled over a communication fabric are presented herein. Execution jobs are received which are directed to a computing cluster. A cluster includes at least one "machine" or compute unit, while a compute unit includes at least a processor element (e.g. CPU). Computing units can also include CoPUs, (such as GPUs), network interfacing elements (e.g. NICs), or data storage elements (e.g. SSDs), but these elements are not required for a computing unit. A compute unit or cluster is formed from a pool of computing components coupled via one or more communication fabrics. Based on properties of the execution jobs, a control system can determine resources needed for the jobs as well as resource scheduling for handling the execution jobs. Once the jobs are slated to be executed, a control system facilitates composition of compute units to handle the execution jobs. The compute units are composed from among computing components that form a pool of computing components. Logical partitioning is established within the communication fabric to form the compute units and isolate each compute unit from each other. Responsive to completions of the execution jobs, the compute units are decomposed back into the pool of computing components.

Discussed herein are various individual physical computing components coupled over one or more shared communication fabrics. Various communication fabric types might be employed herein. For example, a Peripheral Component Interconnect Express (PCIe) fabric can be employed, which might comprise various versions, such as 3.0, 4.0, or 5.0, among others. Instead of a PCIe fabric, other point-to-point communication fabrics or communication buses with associated physical layers, electrical signaling, protocols, and layered communication stacks can be employed. These might include Gen-Z, Ethernet, InfiniBand, NVMe, Internet Protocol (IP), Serial Attached SCSI (SAS), FibreChannel, Thunderbolt, Serial Attached ATA Express (SATA Express), NVLink, Cache Coherent Interconnect for Accelerators (CCIX), Compute Express Link (CXL), Open Coherent Accelerator Processor Interface (OpenCAPI), wireless Ethernet or Wi-Fi (802.11x), or cellular wireless technologies, among others. Ethernet can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless Ethernet formats and speeds. Cellular wireless technologies might include various wireless protocols and networks built around the 3rd Generation Partnership Project (3GPP) standards including 4G Long-Term Evolution (LTE), 5G NR (New Radio) and related 5G standards, among others.

Some of the aforementioned signaling or protocol types are built upon PCIe, and thus add additional features to PCIe interfaces. Parallel, serial, or combined parallel/serial types of interfaces can also apply to the examples herein. Although the examples below employ PCIe as the exemplary fabric type, it should be understood that others can instead be used. PCIe is a high-speed serial computer expansion bus standard, and typically has point-to-point connections among hosts and component devices, or among peer devices. PCIe typically has individual serial links connecting every device to a root complex, also referred to as a host. A PCIe communication fabric can be established using various switching circuitry and control architectures described herein.

The components of the various computing systems herein can be included in one or more physical enclosures, such as rack-mountable modules which can further be included in shelving or rack units. A quantity of components can be inserted or installed into a physical enclosure, such as a modular framework where modules can be inserted and removed according to the needs of a particular end user. An enclosed modular system can include physical support structure and enclosure that includes circuitry, printed circuit boards, semiconductor systems, and structural elements. The modules that comprise the components of such as computing system 100 may be insertable and removable from a rack-mount style or rack unit (U) type of enclosure. It should be understood that the components of FIG. 1 can be included in any physical mounting environment, and need not include any associated enclosures or rackmount elements.

As a first example system, FIG. 1 is presented. FIG. 1 is a system diagram illustrating computing system 100 which employs workload-based hardware composition techniques. Computing system 100 includes computing cluster 101 having pools of physical computing components coupled over communication fabric 140. Computing system 100 also includes management system 110, job interface 111, and job queue 112. The physical computing components include CPUs in CPU pool 141, CoPUs in CoPU pool 142, and storage units in storage pool 143. Additional pools of components can be included, such as pools of network interface controllers (NICs), field programmable gate arrays (FPGAs), fabric-coupled random-access memory (RAM), or other forms of data storage units. These physical computing components of pools 141-143 are communicatively coupled over communication fabric 140, which comprises a PCIe-based fabric in this example. Communication fabric 140 is formed from a plurality of PCIe switch elements and various corresponding PCIe links that couple individually to each of the physical components in computing cluster 101. Communication fabric 140 is configured to communicatively couple a plurality of physical computing components and also establish compute units using logical partitioning within the communication fabric. These compute units, shown for example compute units 120 and 130 in FIG. 1, can each be comprised of any number of job-defined quantities of CPUs, CoPUs, or storage units from the respective pools of physical computing components, including zero of some types of components.

In operation, jobs are received over job interface 111 and placed into queue 112 for execution or other types of handling by elements of system 100. Job interface 111 can comprise network interfaces, user interfaces, terminal interfaces, application programming interfaces (APIs), or Representational state transfer (REST) interfaces, among other interfaces. In some examples, a workload manager software platform (not shown) establishes a front-end for users or operators from which jobs can be created, scheduled, and transferred for execution or handling by system 100. As will be discussed below, other various job interfaces can be employed. These execution jobs have properties which describe the nature of the execution, operation, and handling processes for each job. For example, a job might have an accompanying set of metadata which indicates resources needed to execute the job, or a minimum set of system/computing requirements are necessary to support execution of the job. Job requirements can be indicated as specifications for component types, processing capabilities, storage usage amounts, job completion maximum timeframes, or other indications.

Initially, compute units are not formed or established to support execution or handling of the various jobs. Instead, pools of physical components are established, and compute units can be formed on-the-fly from components within these pools to suit the particular requirements of the execution jobs. To determine which components are needed to be included within a compute unit for a particular execution job, management system 110 processes the aforementioned properties of the execution jobs to determine which resources are needed to support execution or handling of the jobs, and establishes compute units for handling of the jobs. Thus, the total resources of computing cluster 101 can be subdivided as-needed in a dynamic fashion to support execution of varied execution jobs that are received over job interface 111. Compute units are formed at specific times, referred to a composition or being composed, and software for the jobs are deployed to elements of the compute units for execution/handling according to the nature of the jobs. Once a particular job completes on a particular compute unit, that compute unit can be decomposed, which comprises the individual physical components being added back into the pool of physical components for use in creation of further compute units for additional jobs. As will be described herein, various techniques are employed to compose and decompose these compute units.

In FIG. 1, two example execution jobs are highlighted. Namely job 191 and 192 which are held in queue 112 after being received by job interface 111. Once job 191 is received, properties of job 191 are analyzed by management system 110 to determine what physical computing components are required to execute job 191. In FIG. 1, a CPU from CPU pool 141, a CoPU from CoPU pool 142, and a storage unit from storage pool 143 are selected to support job 191, and these physical computing components (CPU 121, CoPU 122, storage unit 123) are composed into compute unit 120. This composition process, noted as element 150 in FIG. 1, occurs at time t1, which can correspond to a schedule or timewise allocation of resources of computing cluster 101 for job 191. Similarly, job 192 has a different set of physical computing components allocated thereto based on the properties of job 192. In FIG. 1, a CPU from CPU pool 141, two CoPUs from CoPU pool 142, and a storage unit from storage pool 143 are selected to support job 192, and these physical computing components (CPU 131, CoPUs 132-133, storage unit 134) are composed into compute unit 130. This composition process, noted as element 151 in FIG. 1, occurs at time t2, which can correspond to a schedule or timewise allocation of resources of computing cluster 101 for job 192.

In addition to the hardware or physical components which are composed into compute units 120 and 130, software components for each of jobs 191-192 are deployed once the compute units are composed. The jobs may include software components which are to be deployed for execution, such as user applications, user data sets, models, scripts, or other job-provided software. Other software might be provided by management system 110, such as operating systems, virtualization systems, hypervisors, device drivers, bootstrap software, BIOS elements and configurations, state information, or other software components. For example, management system 110 might determine that a particular operating system, such as a version of Linux, should be deployed to a composed compute unit to support execution of a particular job. An indication of an operating system type or version might be included in the properties that accompany incoming jobs, or included with other metadata for the jobs. Operating systems, in the form of operating system images, can be deployed to data storage elements that are included in the composed compute units, along with any necessary device drivers to support other physical computing components of the compute units. The jobs might include one or more sets of data which are to be processed by the compute units, along with one or more applications which perform the data processing. Various monitoring or telemetry components can be deployed to monitor activities of the compute units, such as utilization levels, job execution status indicating completeness levels, watchdog monitors, or other elements. In other examples, a catalog of available applications and operating systems can be provided by computing cluster 101, which can be selected by jobs for inclusion into associated compute units. Finally, when the hardware and software components have been composed/deployed to form a compute unit, then the job can execute on the compute unit.

To compose compute units, management system 110 issues commands or control instructions over fabric interface 113 to control elements of communication fabric 140. Physical components are coupled to one or more shared communication fabrics. These components can be logically isolated into any number of separate and arbitrarily defined arrangements (compute units). The communication fabric can be configured by management system 110 to selectively route traffic among the components of a particular compute unit, while maintaining logical isolation between different compute units. In this way, a flexible "bare metal" configuration can be established among the physical components of computing cluster 101. The individual compute units can be associated with external users or client machines that can utilize the computing, storage, network, or graphics processing resources of the compute units. Moreover, any number of compute units can be grouped into a "cluster" of compute units for greater parallelism and capacity. Although not shown in FIG. 1 for clarity, various power supply modules and associated power and control distribution links can also be included for each of the components.

In one example of communication fabric 140, a PCIe fabric is employed. A PCIe fabric is formed from a plurality of PCIe switch circuitry, which may be referred to as PCIe crosspoint switches. PCIe switch circuitry can be configured to logically interconnect various PCIe links based at least on the traffic carried by each PCIe link. In these examples, a domain-based PCIe signaling distribution can be included which allows segregation of PCIe ports of a PCIe switch according to operator-defined groups. The operator-defined groups can be managed by management system 110 which logically assemble components into associated compute units and logically isolate components of different compute units. Management system 110 can control PCIe switch circuitry over fabric interface 113 that comprises the PCIe fabric to alter the logical partitioning or segregation among PCIe ports and thus alter composition of groupings of the physical components. In addition to, or alternatively from the domain-based segregation, each PCIe switch port can be a non-transparent (NT) port or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. Advantageously, this domain-based segregation (NT port-based segregation) can allow physical components (i.e. CPUs, CoPUs, storage units, NICs) to be coupled to a shared fabric or common fabric but only to have present visibility to those components that are included via the segregation/partitioning into a compute unit. Thus, groupings among a plurality of physical components can be achieved using logical partitioning among the PCIe fabric. This partitioning is scalable in nature, and can be dynamically altered as-needed by management system 110 or other control elements.

Returning to a description of the elements of FIG. 1, management system 110 can comprise one or more microprocessors and other processing circuitry that retrieves and executes software, such as job interface 112 and fabric management software, from an associated storage system (not shown). Management system 110 can be implemented within a single processing device but can also be distributed across multiple processing devices or sub-systems that cooperate in executing program instructions. Examples of management system 110 include general purpose central processing units, application specific processors, and logic devices, as well as any other type of processing device, combinations, or variations thereof. In some examples, management system 110 comprises an Intel® or AMD® microprocessor, ARM® microprocessor, field-programmable gate array (FPGA), application specific integrated circuit (ASIC), application specific processor, or other microprocessor or processing elements. Management system 110 includes or provides job interface 111 and queue 112. These elements can comprise various software components executed by processor elements of management system 110, or may instead comprise circuitry.

In FIG. 1, management system 110 provides fabric interface 113. Fabric interface 113 comprises a communication link between management system 110 and any component coupled to communication fabric 140, which may comprise one or more PCIe links. In some examples, fabric interface 113 may employ Ethernet traffic transported over a PCIe link or other link. Additionally, each CPU included in a compute unit in FIG. 1 may be configured with driver or emulation software which may provide for Ethernet communications transported over PCIe links. Thus, any of the CPUs of pool 141 (once deployed into a compute unit) and management system 110 can communicate over Ethernet that is transported over the PCIe fabric. However, implementations are not limited to Ethernet over PCIe and other communication interfaces may be used, including PCIe traffic over PCIe interfaces.

The components of computing cluster 101 include communication fabric 140, CPUs, CoPUs, and storage units. Other various devices can be included, such as NICs, FPGAs, RAM, or programmable read-only memory (PROM) devices. The CPUs of CPU pool 141 each comprise microprocessors, system-on-a-chip devices, or other processing circuitry that retrieves and executes software, such as user applications, from an associated storage system. Each CPU can be implemented within a single processing device but can also be distributed across multiple processing devices or sub-systems that cooperate in executing program instructions. Examples of each CPU include general purpose central processing units, application specific processors, and logic devices, as well as any other type of processing device, combinations, or variations thereof. In some examples, each CPU comprises an Intel®, AMD®, or ARM® microprocessor, graphics cores, compute cores, ASICs, FPGA portions, or other microprocessor or processing elements. Each CPU includes one or more fabric communication interfaces, such as PCIe, which couples the CPU to switch elements of communication fabric 140. CPUs might comprise PCIe endpoint devices or PCIe host devices which may or may not have a root complex.

The CoPUs of CoPU pool 142 each comprise a co-processing element for specialized processing of data sets. For example, CoPU pool 142 can comprise graphics processing resources that can be allocated to one or more compute units. GPUs can comprise graphics processors, shaders, pixel render elements, frame buffers, texture mappers, graphics cores, graphics pipelines, graphics memory, or other graphics processing and handling elements. In some examples, each GPU comprises a graphics 'card' comprising circuitry that supports a GPU chip. Example GPU cards include nVIDIA® or AMD® graphics cards that include graphics processing elements along with various support circuitry, connectors, and other elements. In further examples, other style of co-processing units or co-processing assemblies can be employed, such as machine learning processing units, tensor processing units (TPUs), FPGAs, ASICs, or other specialized processors.

Storage units of storage pool 143 each comprise one or more data storage drives, such as solid-state storage drives (SSDs) or magnetic hard disk drives (HDDs) along with associated enclosures and circuitry. Each storage unit also includes fabric interfaces (such as PCIe interfaces), control processors, and power system elements. In yet other examples, each storage unit comprises arrays of one or more separate data storage devices along with associated enclosures and circuitry. In some examples, fabric interface circuitry is added to storage drives to form a storage unit. Specifically, a storage drive might comprise a storage interface, such as SAS, SATA Express, NVMe, or other storage interface, which is coupled to communication fabric 140 using a communication conversion circuit included in the storage unit to convert the communications to PCIe communications or other fabric interface.

When NICs are included among the physical components of computing cluster 101, each NIC comprises circuitry for communicating over packet networks, such as Ethernet and TCP/IP (Transmission Control Protocol/Internet Protocol) networks. Some examples transport other traffic over Ethernet or TCP/IP, such as iSCSI (Internet Small Computer System Interface). Each NIC comprises Ethernet interface equipment, and can communicate over wired, optical, or wireless links. External access to components of computing cluster 101 can provided over packet network links provided by NICs, which may include presenting iSCSI, Network File System (NFS), Server Message Block (SMB), or Common Internet File System (CIFS) shares over network links. In some examples, fabric interface circuitry is added to storage drives to form a storage unit. Specifically, a NIC might comprise a communication conversion circuit included in the NIC to couple the NIC using PCIe communications or other fabric interface to communication fabric 140.

Communication fabric 140 comprises a plurality of fabric links coupled by communication switch circuits. In examples where PCIe is employed, communication fabric 140 comprise a plurality of PCIe switches which communicate over associated PCIe links with members of compute cluster 101. Each PCIe switch comprises a PCIe cross connect switch for establishing switched connections between any PCIe interfaces handled by each PCIe switch. Communication fabric 140 can allow multiple PCIe hosts to reside on the same fabric while being communicatively coupled only to associated PCIe endpoints. Thus, many hosts (e.g. CPUs) can communicate independently with many endpoints using the same fabric. PCIe switches can be used for transporting data between CPUs, CoPUs, and storage units within compute units, and between compute units when host-to-host communication is employed. The PCIe switches discussed herein can be configured to logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by management system 110 which logically integrate components into associated compute units and logically isolate components from among different compute units. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely circuit-switched configuration. Access over an NT port or ports can include additional handshaking between the PCIe switch and the initiating endpoint to select a particular NT port or to allow visibility through the NT port. In some examples, each PCIe switch comprises PLX/Broadcom/Avago PEX series chips, such as PEX8796 24-port, 96 lane PCIe switch chips, PEX8725 10-port, 24 lane PCIe switch chips, PEX97xx chips, PEX9797 chips, or other PEX87xx/PEX97xx chips.

Figure 2:
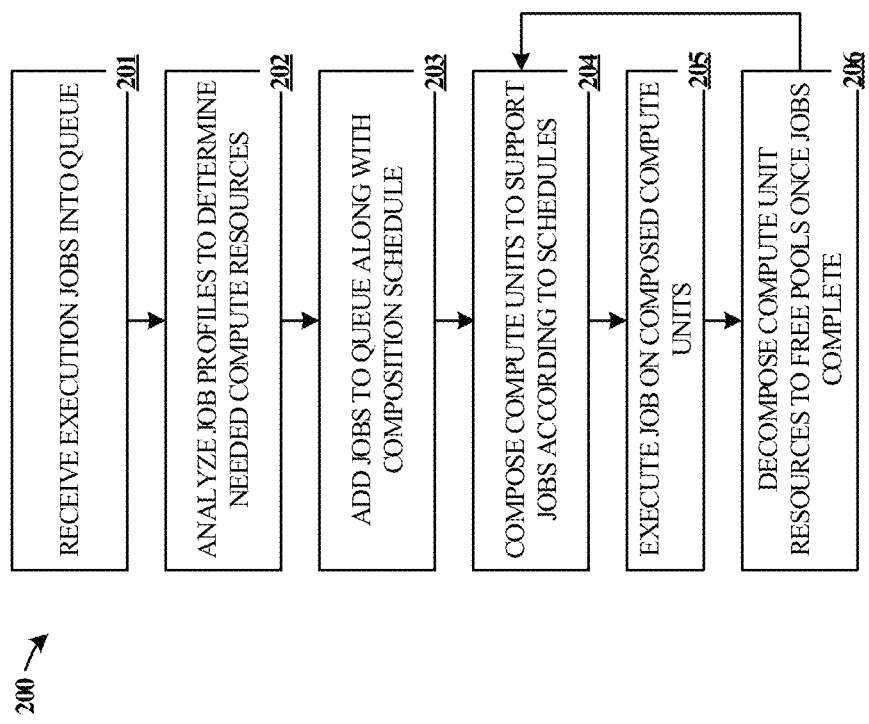
FIG. 2 includes a flow diagram that illustrates an operational example of a computing system in an implementation.

FIG. 2 is included to illustrate example operations of the elements of FIG. 1. In operation 201, job interface 111 of management system 110 receives execution jobs into queue 112. This enqueuing process can include receiving execution jobs directed to computing cluster 101 comprising a pool of computing components coupled to at least communication fabric 140. In operation 202, management system 110 analyzes job profiles to determine needed compute resources, and in operation 203, adds jobs to queue 112 along with composition scheduling information. Based on properties of the execution jobs, management system 110 determines resource scheduling for handling the execution jobs, the resource scheduling indicating timewise allocations of resources of computing cluster 101. The resource scheduling comprises one or more data structures relating identifiers for the execution jobs, indications of the sets of computing components needed to run each of the execution jobs, timeframes to initiate composition and decomposition of the compute units, and indications of software components to deploy to the compute units for the execution jobs.

In operation 204, management system 110 composes compute units to support the jobs according to the schedules indicated in queue 112. Management system 110 initiates the execution jobs on computing cluster 101 according to the resource scheduling by at least instructing communication fabric 140 to compose compute units comprising sets of computing components selected from among the pool of computing components to handle the execution jobs. Instructing communication fabric 140 to compose the compute units comprises instructing communication fabric 140 to form logical isolations within the communication fabric communicatively coupling the sets of computing components. The logical isolations each allow computing components within each of the sets of computing components to communicate over the communication fabric only within corresponding logical isolations. In accordance with the resource scheduling, management system 110 controls the communication fabric for deployment of software components to the compute units for running the execution jobs once each of the compute units are formed. Then, in operation 205, the composed compute units execute corresponding jobs on the composed compute units. Finally, once the execution jobs complete, in operation 206, management system 110 decomposes compute unit resources back to free pools. The compute units are decomposed back into the pools of computing components. Management system 110 instructs communication fabric 140 to decompose the compute units by removing a corresponding logical isolation for the compute units such that computing components of the compute units are made available for composition into additional compute units.

The operations of FIG. 2, and other examples herein, discuss job-based initiation of compute unit composition and de-composition. Thus, the initiation of execution jobs and the associated job properties can trigger creation of compute units that execute the jobs. Other triggers can be employed in these examples herein, either separately or in combination with the aforementioned triggers. In a first alternative trigger, an event-based trigger is employed. These event-based triggers can alter or modify a compute unit or add additional compute units to support jobs or work units that comprise jobs. Based on observations by management system 110 of dynamic events or patterns exhibited by jobs, management system 110 can initiate changes to the configurations of compute units and resources assigned thereto. Examples of such events or patterns include observed resource shortages for a process, a specific string being identified by a function, a specific signal identified by an intelligent infrastructure algorithm, or other factors which can be monitored by management system 110. Telemetry of the executing jobs or analysis of the properties of the jobs prior to or during execution can inform management system 110 to initiate dynamic changes to the compute units. Thus, management system 110 can alter composition of compute units to add or remove resources (e.g. physical computing components) for the compute units according to the events or patterns. Advantageously, the compute units can be better optimized to support present resource needs of each job, while providing for resources to be intelligently returned to the pool when unneeded by present jobs or for use by other upcoming jobs.

Another alternative trigger includes temporal triggers based on machine learning type of algorithms or user-defined timeframes. In this example, patterns or behaviors of composed compute units can be determined or learned over time such that particular types of jobs exhibit particular types of behaviors. Based on these behaviors, changes to compute units can be made dynamically to support workload patterns. For example, management system 110 might determine that at certain phases of execution of particular types of execution jobs that more/less storage resources are needed, or more/less co-processing resources are needed. Management system 110 can predictively or preemptively alter the composition of a compute unit, which may include addition or removal of resources, to better optimize the current resources assigned to a compute unit with the work units being executed by a job. Temporal properties can be determined by management system 110 based on explicit user input or based on machine learning processes to determine timeframes to add or remove resources from compute units. Management system 110 can include resource scheduler elements which can determine what resource changes are needed and when these changes are desired to support current and future job needs. The changes to the compute units discussed herein may require re-composition and re-starting of the compute units and associated operating systems in some examples, such as when adding or removing certain physical components or resources. However, other changes, such as adding/removing storage or network interface resources might be accomplished on-the-fly without re-staring or re-composition of a particular compute unit.

Figure 3:
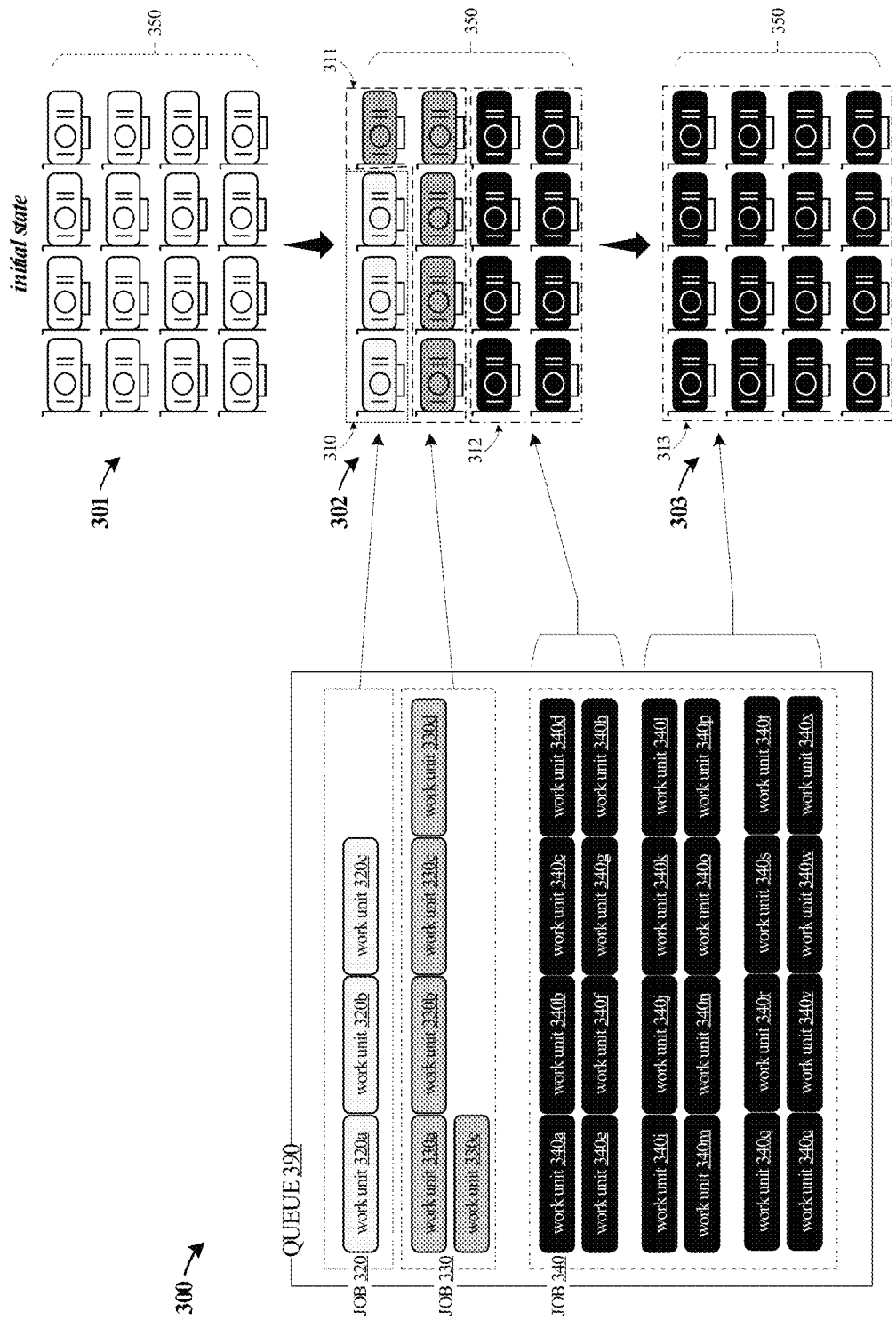
FIG. 3 is a diagram illustrating management of a computing system in an implementation.

Turning now to a detailed discussion of techniques for workload-based hardware composition, FIG. 3 is presented. FIG. 3 illustrates configuration 300 having several compute unit composition operations. Workload queue 390 is included which has several example execution jobs 320, 330, and 340 enqueued therein. Also included is an example pool of physical computing components, namely a set of sixteen (16) GPUs. Although only GPUs are shown in this example for clarity, other co-processing elements or other types of elements can be included with selected GPUs to form compute units, such as CPUs and storage units, among other elements. Thus, the execution jobs within queue 390 in FIG. 3 comprise jobs that employ graphics processing resources, such as machine learning jobs, artificial intelligence jobs, graphics rendering jobs, or other types of data processing jobs which can benefit from executing across multiple concurrent GPUs.

As execution jobs 320, 330, and 340 are received over a corresponding job interface, properties of execution jobs 320, 330, and 340 are analyzed to determined which physical computing components are required to execute such jobs. These properties might directly indicate a quantity and configuration of computing components among GPUs, CPUs, or storage elements desired for the job, or the quantity and configuration of computing components can be inferred by resource requirements indicated by the jobs. For example, execution jobs might indicate a certain minimum class or type of CPU or GPU is desired (and quantity), and anything beyond that capability is acceptable. Each of execution jobs 320, 330, and 340 can be subdivided into portions indicated as work units in FIG. 3. Each work unit can be deployed to a different GPU within a compute unit.

Once a schedule indicates that an execution job should be executed, a management element can form compute units for each job. An initial state 301 of pool of GPUs 350 indicates that all GPUs are idle and not presently handling jobs, although other initial states are possible. In state 302, execution jobs 320, 330, and 340 are deployed onto compute units that are newly composed to support each of execution jobs 320, 330, and 340. Namely, compute unit 310 is composed to support execution job 320, compute unit 311 is composed to support execution job 330, and compute unit 312 is composed to support a first portion of job 340. Since execution jobs 320 and 330 consume a portion of pool of GPUs 350, compute unit 312 is left with a remainder quantity of GPUs which may be less than necessary for full accommodation of job 340. In some examples, job 340 might be delayed until all necessary resources are available, or instead a partial accommodation might be employed as seen in FIG. 3.

After a period of time, execution jobs will complete or finish. As these jobs complete, resources of the compute units assigned to those jobs are relinquished back into the pool of free resources for usage on additional jobs. In FIG. 3, as execution jobs 320 and 330 complete, as well as initial work units of execution job 340, then subsequent work units of execution job 340 can encompass the relinquished GPUs. To deploy the subsequent work units of execution job 340, compute unit 313 is composed. Compute unit 313 might comprise a modified version of compute unit 312 or a new compute unit formed in response to relinquishment of GPU resources. State 303 thus indicates all GPUs of pool of GPUs 350 within compute unit 313 and executing work units of execution job 340.

Figure 4:
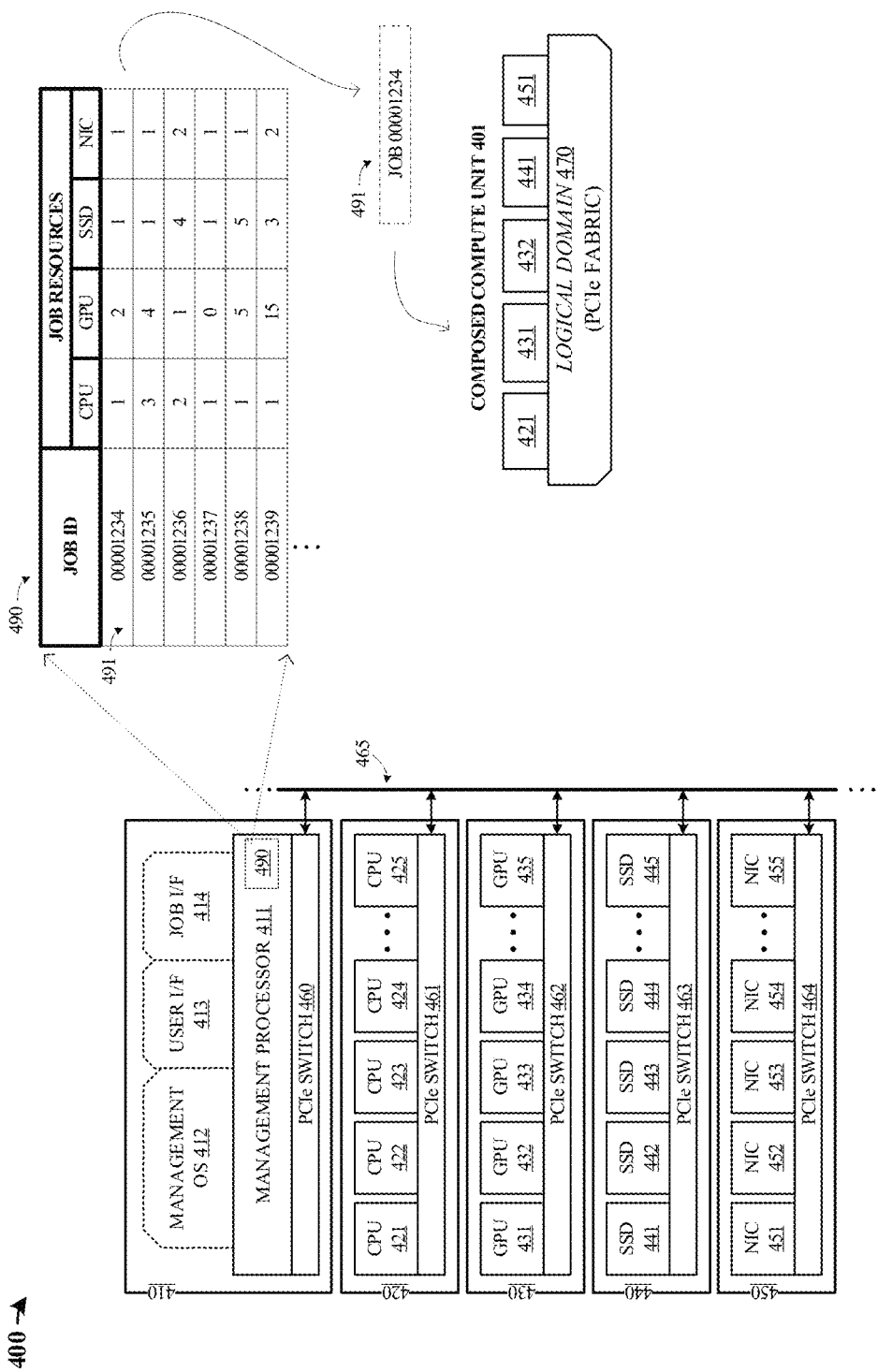
FIG. 4 is a diagram illustrating a computing system in an implementation.

FIG. 4 is a system diagram illustrating computing platform 400. Computing platform 400 comprises a rackmount arrangement of modular chassis. One or more physical enclosures, such as the modular chassis, can further be included in shelving or rack units. Chassis 410, 420, 430, 440, and 450 are included in computing platform 400, and may be mounted in a common rackmount arrangement or span multiple rackmount arrangements in one or more data centers. Within each chassis, modules are mounted to a shared PCIe switch, along with various power systems, structural supports, and connector elements. A predetermined number of components of computing platform 400 can be inserted or installed into a physical enclosure, such as a modular framework where modules can be inserted and removed according to the needs of a particular end user. An enclosed modular system can include physical support structure and enclosure that includes circuitry, printed circuit boards, semiconductor systems, and structural elements. The modules that comprise the components of computing platform 400 are insertable and removable from a rackmount style of enclosure. In some examples, the elements of FIG. 4 are included in a 'U' style chassis for mounting within the larger rackmount environment. It should be understood that the components of FIG. 4 can be included in any physical mounting environment, and need not include any associated enclosures or rackmount elements.

Chassis 410 comprises a management module or top-of-rack (ToR) switch chassis and comprises management processor 411 and PCIe switch 460. Management processor 411 comprises management operating system (OS) 412, user interface 413, and job interface 414. Management processor 411 is coupled to PCIe switch 460 over one or more PCIe links comprising one or more PCIe lanes.

PCIe switch 460 is coupled over one or more PCIe links to PCIe switches 461-464 in the other chassis in computing platform 400. These one or more PCIe links are represented by PCIe intermodular connections 465. PCIe switches 460-464 and PCIe intermodular connections 465 form a PCIe fabric that communicatively couples all of the various physical computing elements of FIG. 4. In some examples, management processor 411 might communicate over special management PCIe links or sideband signaling (not shown), such as inter-integrated circuit (I2C) interfaces, with elements of the PCIe fabric to control operations and partitioning of the PCIe fabric. These control operations can include composing and decomposing compute units, altering logical partitioning within the PCIe fabric, monitoring telemetry of the PCIe fabric, controlling power up/down operations of modules on the PCIe fabric, updating firmware of various circuitry that comprises the PCIe fabric, and other operations.

Chassis 420 comprises a plurality of CPUs 421-425 each coupled to the PCIe fabric via PCIe switch 461 and associated PCIe links (not shown). Chassis 430 comprises a plurality of GPUs 431-435 each coupled to the PCIe fabric via PCIe switch 462 and associated PCIe links (not shown). Chassis 440 comprises a plurality of SSDs 441-445 each coupled to the PCIe fabric via PCIe switch 463 and associated PCIe links (not shown). Chassis 450 comprises a plurality of NICs 451-455 each coupled to the PCIe fabric via PCIe switch 464 and associated PCIe links (not shown). Each chassis 420, 430, 440, and 450 can include various modular bays for mounting modules that comprise the corresponding elements of each CPU, GPU, SSD, or NIC. Power systems, monitoring elements, internal/external ports, mounting/removal hardware, and other associated features can be included in each chassis. A further discussion of the individual elements of chassis 420, 430, 440, and 450 is included below.

Once the various CPU, GPU, SSD, or NIC components of computing platform 400 have been installed into the associated chassis or enclosures, the components can be coupled over the PCIe fabric and logically isolated into any number of separate and arbitrarily defined arrangements called "machines" or compute units. Compute units can each be composed with selected quantities of CPUs, GPUs, SSDs, and NICs, including zero of any type of module—although typically at least one CPU is included in each compute unit. One example compute unit 401 is shown in FIG. 4, which includes CPU 421, GPUs 431-432, SSD 441, and NIC 451. Compute unit 401 is composed using logical partitioning within the PCIe fabric, indicated by logical domain 470. The PCIe fabric can be configured by management processor 411 to selectively route traffic among the components of a particular compute unit, while maintaining logical isolation between components not included in a particular compute unit. In this way, a disaggregated and flexible "bare metal" configuration can be established among the components of platform 100. The individual compute units can be associated with external users, incoming jobs, or client machines that can utilize the computing, storage, network, or graphics processing resources of the compute units. Moreover, any number of compute units can be grouped into a "cluster" of compute units for greater parallelism and capacity.

In some examples, management processor 411 may provide for creation of compute units via one or more user interfaces or job interfaces. For example, management processor 411 may provide user interface 413 which may present machine templates for compute units that may specify hardware components to be allocated, as well as software and configuration information, for compute units created using the template. In some examples, a compute unit creation user interface may provide machine templates for compute units based on use cases or categories of usage for compute units. For example, the user interface may provide suggested machine templates or compute unit configurations for game server units, artificial intelligence learning compute units, data analysis units, and storage server units. For example, a game server unit template may specify additional processing resources when compared to a storage server unit template. Further, the user interface may provide for customization of the templates or compute unit configurations and options for users to create compute unit templates from component types selected arbitrarily from lists or categories of components.

In additional examples, management processor 411 may provide for policy based dynamic adjustments to compute units during operation. In some examples, user interface 413 can allow the user to define policies for adjustments of the hardware and software allocated to the compute unit as well as adjustments to the configuration information thereof during operation. In an example, during operation, management processor 411 may analyze telemetry data of the compute unit to determine the utilization of the current resources. Based on the current utilization, a dynamic adjustment policy may specify that processing resources, storage resources, networking resources, and so on be allocated to the compute unit or removed from the compute unit. For example, the telemetry data may show that the current usage level of the allocated storage resources of a storage compute unit is approaching one hundred percent and allocate an additional storage device to the compute unit.

Figure 5:
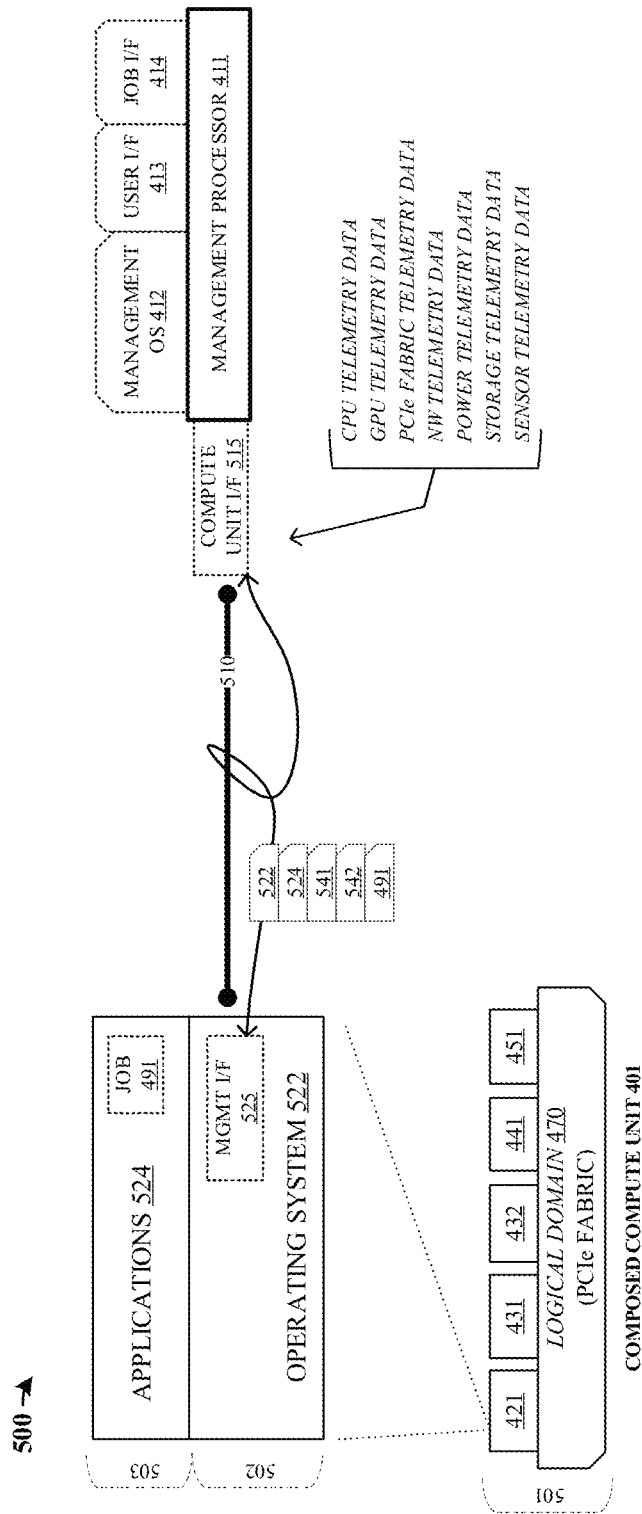
FIG. 5 is a diagram illustrating management elements of a computing system in an implementation.

In even further examples, management processor 411 may provide for execution job-based dynamic adjustments to compute units during operation. In some examples, job interface 414 can receive indications of execution jobs to be handled by computing platform 400. Management processor 411 can analyze these incoming jobs to determine system requirements for executing/handling the jobs, which comprise resources selected among CPUs, GPUs, SSDs, NICs, and other resources. In FIG. 4, table 490 indicates several jobs which have been received over job interface 414 and enqueued into a job queue. Table 490 indicates a unique job identifier (ID) followed by various granular system components which are to be included within compute units formed to support the jobs. For example, job 491 has a job ID of 00001234 and indicates one CPU, two GPUs, one SSD, and one NIC are to be included in a compute unit formed to execute job 491. Accordingly, when the time comes to execute job 491, management processor 411 establishes compute unit 401 composed of CPU 421, GPUs 431-432, SSD 441, and NIC 451. Compute unit 401 is composed using logical partitioning within the PCIe fabric, indicated by logical domain 470. Logical domain 470 allows for CPU 421, GPUs 431-432, SSD 441, and NIC 451 to communicate over PCIe signaling, while isolating PCIe communications other components of other logical domains and other compute units from compute unit 401—all while sharing the same PCIe fabric. Job 491 can execute on compute unit 401 once various software components have been deployed to compute unit 401. FIG. 5 illustrates deployment of these various software components.

Although a PCIe fabric is discussed in the context of FIG. 4, management processor 411 may provide for control and management of multiple protocol communication fabrics. For example, management processor 411 and the PCIe switch devices of the PCIe fabric may provide for communicative coupling of physical components using multiple different implementations or versions of PCIe and similar protocols. For example, different PCIe versions (e.g. 3.0, 4.0, 5.0, and later) might be employed for different physical components in the same PCIe fabric. Further, next-generation interfaces can be employed, such as Gen-Z, CCIX, CXL, OpenCAPI, or wireless interfaces including Wi-Fi interfaces or cellular wireless interfaces. Also, although PCIe is used in FIG. 4, it should be understood that PCIe may be absent and different communication links or busses can instead be employed, such as NVMe, Ethernet, SAS, FibreChannel, Thunderbolt, SATA Express, among other interconnect, network, and link interfaces.

Turning now to a discussion on the components of computing platform 400, management processor 411 can comprise one or more microprocessors and other processing circuitry that retrieves and executes software, such as management operating system 412, user interface 413, and job interface 414, from an associated storage system. Management processor 411 can be implemented within a single processing device but can also be distributed across multiple processing devices or sub-systems that cooperate in executing program instructions. Examples of management processor 411 include general purpose central processing units, application specific processors, and logic devices, as well as any other type of processing device, combinations, or variations thereof. In some examples, management processor 411 comprises an Intel® or AMD® microprocessor, ARM® microprocessor, field-programmable gate array (FPGA), application specific integrated circuit (ASIC), application specific processor, or other microprocessor or processing elements.

Management operating system (OS) 412 is executed by management processor 411 and provides for management of resources of computing platform 400. This management includes composition, alteration, de-composition, and monitoring of one or more compute units. Management OS 412 provides for the functionality and operations described herein for management processor 411. User interface 413 can present graphical user interfaces (GUIs), Application Programming Interfaces (APIs), or command line interfaces (CLIs), Web Socket interfaces, to one or more users. User interface 413 can be employed by end users or administrators to establish compute units, assign resources to compute units, create clusters of compute units, and perform other operations. In some examples, user interface 413 provides an interface to allow a user to determine one or more compute unit templates and dynamic adjustment policy sets to use or customize for use in creation of compute units. User interface 413 can be employed to manage, select, and alter machine templates. User interface 413 can be employed to manage, select, and alter policies for compute units. User interface 413 also can provide telemetry information for the operation of computing platform 400 to users, such as in one or more status interfaces or status views. The state of various components or elements of computing platform 400 can be monitored through user interface 413, such as CPU states, GPU states, NIC states, SSD states, PCIe switch/fabric states, among others. Various performance metrics, error statuses can be monitored using user interface 413.

More than one instance of elements 411-414 can be included in computing platform 400. Each management instance can manage resources for a predetermined number of clusters or compute units. User commands, such as those received over a GUI, can be received into any of the management instances and forwarded by the receiving management instance to the handling management instance. Each management instance can have a unique or pre-assigned identifier which can aid in delivery of user commands to the proper management instance. Additionally, management processors of each management instance can communicate with each other, such as using a mailbox process or other data exchange technique. This communication can occur over dedicated sideband interfaces, such as I2C interfaces, or can occur over PCIe or Ethernet interfaces that couple each management processor.

A plurality of CPUs 421-425 are included in chassis 420. Each CPU may comprise a CPU module that includes one or more CPUs or microprocessors and other processing circuitry that retrieves and executes software, such as operating systems, device drivers, and applications, from an associated storage system. Each CPU can be implemented within a single processing device but can also be distributed across multiple processing devices or sub-systems that cooperate in executing program instructions. Examples of each CPU include general purpose central processing units, application specific processors, and logic devices, as well as any other type of processing device, combinations, or variations thereof. In some examples, each CPU comprises an Intel® or AMD® microprocessor, ARM® microprocessor, graphics processor, compute cores, graphics cores, ASIC, FPGA, or other microprocessor or processing elements. Each CPU can also communicate with other compute units, such as those in a same storage assembly/enclosure or another storage assembly/enclosure over one or more PCIe interfaces and PCIe fabrics.

A plurality of GPUs 431-435 are included in chassis 430. Each GPU may comprise a GPU module that includes one or more GPUs. Each GPU includes graphics processing resources that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU comprises a graphics 'card' comprising circuitry that supports a GPU chip. Example GPU cards include nVIDIA® or AMD® graphics cards that include graphics processing elements along with various support circuitry, connectors, and other elements. In further examples, other style of graphics processing units, graphics processing assemblies, or co-processing elements can be employed, such as machine learning processing units, tensor processing units (TPUs), FPGAs, ASICs, or other specialized processors that may include specialized processing elements to focus processing and memory resources on processing of specialized sets of data.

A plurality of SSDs 441-445 are included in chassis 440. Each SSD may comprise an SSD module that includes one or more SSD. Each SSD includes one or more storage drives, such as solid-state storage drives with a PCIe interface. Each SSD also includes PCIe interfaces, control processors, and power system elements. Each SSD may include a processor or control system for traffic statistics and status monitoring, among other operations. In yet other examples, each SSD instead comprises different data storage media, such as magnetic hard disk drives (HDDs), crosspoint memory (e.g. Optane® devices), static random-access memory (SRAM) devices, programmable read-only memory (PROM) devices, or other magnetic, optical, or semiconductor-based storage media, along with associated enclosures, control systems, power systems, and interface circuitry.

A plurality of NICs 451-455 are included in chassis 450. Each NIC may comprise a NIC module that includes one or more NIC. Each NIC may include network interface controller cards for communicating over TCP/IP (Transmission Control Protocol (TCP)/Internet Protocol) networks or for carrying user traffic, such as iSCSI (Internet Small Computer System Interface) or NVMe (NVM Express) traffic for elements of an associated compute unit. NICs can comprise Ethernet interface equipment, and can communicate over wired, optical, or wireless links. External access to components of computing platform 400 can be provided over packet network links provided by the NICs. NICs might communicate with other components of an associated compute unit over associated PCIe links of the PCIe fabric. In some examples, NICs are provided for communicating over Ethernet links with management processor 411. In additional examples, NICs are provided for communicating over Ethernet links with one or more other chassis, rackmount systems, data centers, computing platforms, communication fabrics, or other elements.

Other specialized devices might be employed in computing platform in addition to CPUs, GPUs, SSDs, and NICs. These other specialized devices can include co-processing modules comprising specialized co-processing circuitry, fabric-coupled RAM devices, ASIC circuitry, or FPGA circuitry, as well as various memory components, storage components, and interfacing components, among other circuitry. The other specialized devices can each include a PCIe interface comprising one or more PCIe lanes. These PCIe interfaces can be employed to communicate over the PCIe fabric and for inclusion of the other specialized devices in one or more compute units. These other specialized devices might comprise PCIe endpoint devices or PCIe host devices which may or may not have a root complex.

FPGA devices can be employed as one example of the other specialized devices. FPGA devices can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device. In some examples, an FPGA arrangement can include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. FPGA arrangements can also include SRAM devices or PROM devices used to perform boot programming, power-on configuration, or other functions to establish an initial configuration for the FPGA device. In some examples, the SRAM or PROM devices can be incorporated into FPGA circuitry or packaging.

PCIe switches 460-464 communicate over associated PCIe links. In the example in FIG. 4, PCIe switches 460-464 can be used for carrying user data between PCIe devices within each chassis and between each chassis. Each PCIe switch 460-464 comprises a PCIe cross connect switch for establishing switched connections between any PCIe interfaces handled by each PCIe switch. The PCIe switches discussed herein can logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by management processor 411 which logically integrates components into associated compute units and logically isolates components and compute units from among each other. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, SSD, NIC) only to have visibility to those components that are included via the segregation/partitioning. Thus, groupings among a plurality of physical components can be achieved using logical partitioning among the PCIe fabric. This partitioning is scalable in nature, and can be dynamically altered as-needed by management processor 411 or other control elements. Management processor 411 can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components can be added to or removed from compute units according to user instructions received over a user interface, dynamically in response to loading/idle conditions, dynamically in response to incoming or queued execution jobs, or preemptively due to anticipated need, among other considerations discussed herein.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs. The PCIe fabric may have a 64-bit address space, which allows an addressable space of 264 bytes, leading to at least 16 exbibytes of byte-addressable memory. The 64-bit PCIe address space can be shared by all compute units or segregated among various compute units forming arrangements for appropriate memory mapping to resources.

PCIe interfaces can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later (e.g. 4.0, 5.0, or later) might be employed. Moreover, next-generation interfaces can be employed, such as Gen-Z, Cache Coherent CCIX, CXL, or OpenCAPI. Also, although PCIe is used in FIG. 4, it should be understood that different communication links or busses can instead be employed, such as NVMe, Ethernet, SAS, FibreChannel, Thunderbolt, SATA Express, among other interconnect, network, and link interfaces. NVMe is an interface standard for mass storage devices, such as hard disk drives and solid-state memory devices. NVMe can supplant SATA interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 4 can each use various communication media, such as air, space, metal, optical fiber, or some other signal propagation path, including combinations thereof. Any of the links in FIG. 4 can include any number of PCIe links or lane configurations. Any of the links in FIG. 4 can each be a direct link or might include various equipment, intermediate components, systems, and networks. Any of the links in FIG. 4 can each be a common link, shared link, aggregated link, or may be comprised of discrete, separate links.

The discussion now turns to detailed examples of compute unit formation and handling. In FIG. 4, any CPU 421-425 has configurable logical visibility to any/all GPUs 431-435, SSDs 441-445, and NICs 451-455, or other physical components coupled to the PCIe fabric of computing platform 400, as segregated logically by the PCIe fabric. For example, any CPU 421-425 can transfer and retrieve storage data with any SSD 441-445 that is included in the same compute unit. Likewise, any CPU 421-425 can exchange data for processing by any GPU 431-435 included in the same compute unit. Thus, 'm' number of SSDs or GPUs can be coupled with 'n' number of CPUs to allow for a large, scalable architecture with a high-level of performance, redundancy, and density. In graphics processing examples, NT partitioning or domain-based partitioning in the PCIe fabric can be provided by one or more of the PCIe switches. This partitioning can ensure that GPUs can be interworked with a desired CPU or CPUs and that more than one GPU, such as eight (8) GPUs, can be associated with a particular compute unit. Moreover, dynamic GPU-compute unit relationships can be adjusted on-the-fly using partitioning across the PCIe fabric. Shared NIC resources can also be applied across compute units.

FIG. 5 is a system diagram that includes further details on elements from FIG. 4, such as formation of compute units and deployment of software components thereto. System 500 includes management processor 411 which communicates over link 510 with composed compute unit 401. Composed compute unit 401 comprises CPU 421, GPUs 431-432, SSD 441, and NIC 451. CPU 421 has software deployed thereto which comprises operating system 522, applications 524, compute unit interface 525, and execution job 491. Thus, CPU 421 is shown as having several operational layers. A first layer 501 is the hardware layer or "metal" machine infrastructure of compute unit 401 which is formed over a PCIe fabric using logical domain 470. A second layer 502 provides the OS as well as compute unit interface 525. Finally, a third layer 503 provides user-level applications and execution jobs.

Management OS 111 also includes management interface 515 which communicates over link 510 with compute unit interface 525 deployed on compute unit 401. Management interface 515 enables communication with a compute unit to transfer software components to the compute unit as well as receive status, telemetry, and other data from the compute unit. Management interface 515 and compute unit interface 525 scan provide standardized interfaces for management traffic, such as for control instructions, control responses, telemetry data, status information, or other data. The standardized interfaces may comprise one or more APIs.

In some examples, compute unit interface comprises an emulated network interface. This emulated network interface comprises a transport mechanism for transporting packet network traffic over one or more PCIe interfaces. The emulated network interface can emulate a network device, such as an Ethernet device, to management processor 411 so that management processor 411 can interact/interface with CPU 421 of compute unit 401 over a PCIe interface as if management processor 411 and CPU 421 are communicating over an Ethernet network interface. The emulated network interface can comprise a kernel-level element or module which allows an OS to interface using Ethernet-style commands and drivers, and allow applications or OS-level processes to communicate with the emulated network device without having associated latency and processing overhead associated with a full network stack. The emulated network interface comprises a software component, such as a driver, module, kernel-level module, or other software component that appears as a network device to the application-level and system-level software executed by the CPU of the compute unit. Advantageously, the emulated network interface does not require network stack processing to transfer communications. For a compute unit, such as compute unit 401, an emulated network interface does not employ network stack processing yet still appears as network device to operating system 522, so that user software or operating system elements of the associated CPU can interact with network interface and communicate over a PCIe fabric using existing network-facing communication methods, such as Ethernet communications. The emulated network interface of management processor 411 transfers communications as associated traffic over a PCIe interface or PCIe fabric to another emulated network device located on compute unit 401. The emulated network interface translates PCIe traffic into network device traffic and vice versa. Processing communications transferred to the emulated network device over a network stack is omitted, where the network stack would typically be employed for the type of network device/interface presented. For example, the emulated network device might be presented as an Ethernet device to the operating system or applications. Communications received from the operating system or applications are to be transferred by the emulated network device to one or more destinations. However, the emulated network interface does not include a network stack to process the communications down from an application layer down to a link layer. Instead, the emulated network interface extracts the payload data and destination from the communications received from the operating system or applications and translates the payload data and destination into PCIe traffic, such as by encapsulating the payload data into PCIe frames using addressing associated with the destination.

Compute unit interface 525 can include emulated network interfaces, such as discussed for an emulated network interface. Additionally, compute unit interface 525 monitors operation of CPU 421 and software executed by CPU 421 and provides telemetry for this operation to management processor 411. Thus, any user provided software can be executed by CPU 421, such as user-provided operating systems (Windows, Linux, MacOS, Android, iOS, etc. . . . ), execution job 491, user applications 524, or other software and drivers. Compute unit interface 525 provides functionality to allow CPU 421 to participate in the associated compute unit and/or cluster, as well as provide telemetry data to management processor 411 over link 510. In examples in which compute units include physical components that utilize multiple or different communications protocols, compute unit interface 525 may provide functionality to enable inter-protocol communication to occur within the compute unit. Each CPU of a compute unit can also communicate with each other over an emulated network device that transports the network traffic over the PCIe fabric. Compute unit interface 525 also can provide an API for user software and operating systems to interact with compute unit interface 525 as well as exchange control/telemetry signaling with management processor 411.

In addition, compute unit interface 525 may operate as an interface to device drivers of PCIe devices of the compute unit to facilitate an inter-protocol or peer-to-peer communication between device drivers of the PCIe devices of the compute unit, for example, when the PCIe devices utilize different communication protocols. In addition, compute unit interface 525 may operate to facilitate continued operation during dynamic adjustments to the compute unit based on dynamics adjustment policies. Further, compute unit interface 525 may operate to facilitate migration to alternative hardware in computing platforms based on a policy (e.g. migration from PCIe version 3.0 hardware to Gen-Z hardware based on utilization or responsiveness policies). Control elements within corresponding PCIe switch circuitry may be configured to monitor for PCIe communications between compute units utilizing different versions or communication protocols. As discussed above, different versions or communication protocols may be utilized within the computing platform and, in some implementations, within compute units. In some examples, one or more PCIe switches or other devices within the PCIe fabric may operate to act as interfaces between PCIe devices utilizing the different versions or communication protocols. Data transfers detected may be "trapped" and translated or converted to the version or communication protocol utilized by the destination PCIe device by the PCIe switch circuitry and then routed to the destination PCIe device.

Figure 6:
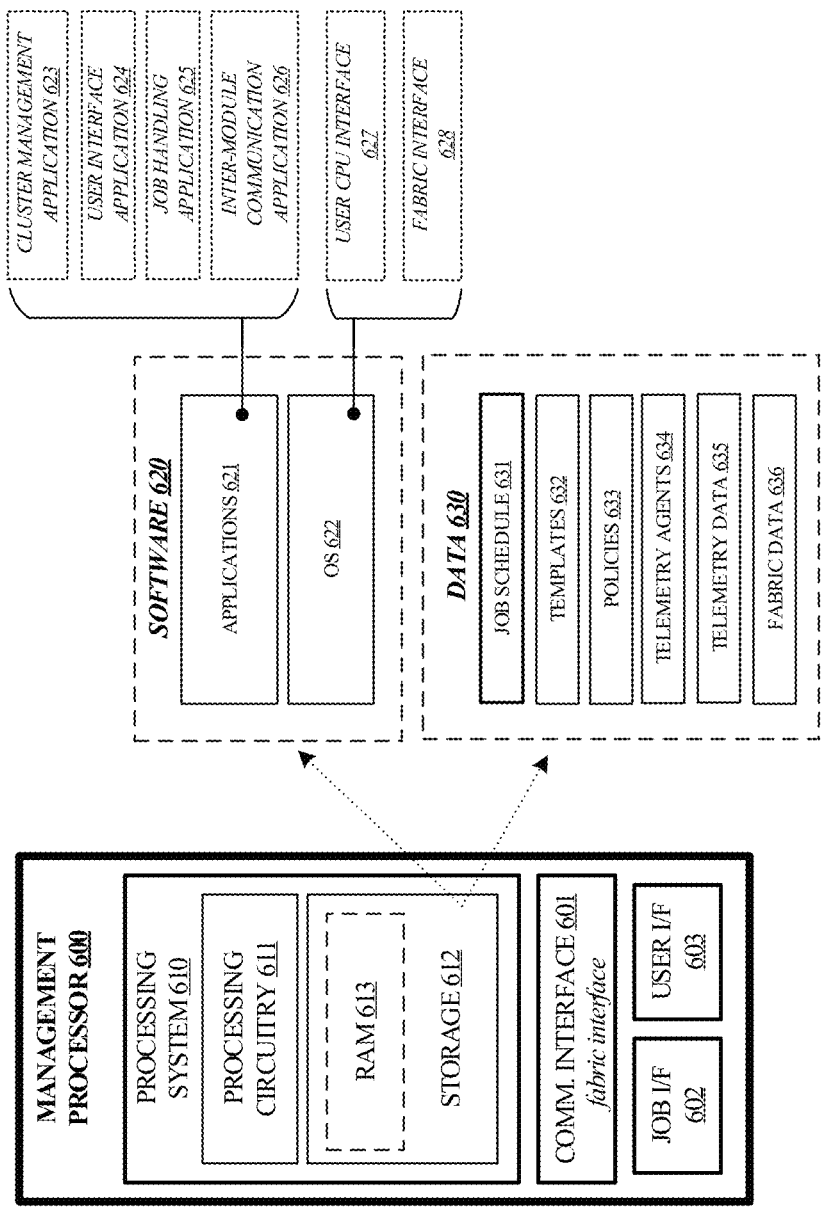
FIG. 6 is a diagram illustrating a management processor in an implementation.

FIG. 6 is a block diagram illustrating an implementation of management processor 600. Management processor 600 illustrates an example of any of the management processors discussed herein, such as management system 110 of FIG. 1 or management processor 411 of FIGS. 4 and 5. Management processor 600 includes communication interface 601, job interface 602, user interface 603, and processing system 610. Processing system 610 includes processing circuitry 611 and data storage system 612 which can include random access memory (RAM) 613, although additional or different configurations of elements can be included.

Processing circuitry 611 can be implemented within a single processing device but can also be distributed across multiple processing devices or sub-systems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Communication interface 601 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 601 can include network interfaces configured to communicate using one or more network addresses, which can be associated with different network links. Examples of communication interface 601 include network interface card equipment, transceivers, modems, and other communication circuitry. Communication interface 601 can communicate with elements of a PCIe fabric or other communication fabric to establish logical partitioning within the fabric, such as over an administrative or control interface of one or more communication switches of the communication fabric.

Job interface 602 comprises a network-based interface or other remote interface that accepts execution jobs from one or more external systems and provides execution job results and status to such external systems. Jobs are received over job interface 602 and placed into job schedule 631 for execution or other types of handling by elements of a corresponding computing platform. Job interface 602 can comprise network interfaces, user interfaces, terminal interfaces, application programming interfaces (APIs), or Representational state transfer (REST) interfaces, among other interfaces. In some examples, a workload manager software platform (not shown) establishes a front-end for users or operators from which jobs can be created, scheduled, and transferred for execution or handling. Job interface 602 can receive indications of these jobs from the workload manager software platform.

User interface 603 may include a touchscreen, keyboard, mouse, voice input device, audio input device, or other touch input device for receiving input from a user. Output devices such as a display, speakers, web interfaces, terminal interfaces, and other types of output devices may also be included in user interface 603. User interface 603 can provide output and receive input over a network interface, such as communication interface 601. In network examples, user interface 603 might packetize display or graphics data for remote display by a display system or computing system coupled over one or more network interfaces. Physical or logical elements of user interface 603 can provide alerts or visual outputs to users or other operators. User interface 603 may also include associated user interface software executable by processing system 610 in support of the various user input and output devices discussed above. Separately or in conjunction with each other and other hardware and software elements, the user interface software and user interface devices may support a graphical user interface, a natural user interface, or any other type of user interface.

User interface 603 can present graphical user interface (GUI) to one or more users. The GUI can be employed by end users or administrators to establish clusters, assign assets (compute units/machines) to each cluster. In some examples, the GUI or other portions of user interface 603 provides an interface to allow an end user to determine one or more compute unit templates and dynamic adjustment policy sets to use or customize for use in creation of compute units. User interface 603 can be employed to manage, select, and alter machine templates or alter policies for compute units. User interface 603 also can provide telemetry information, such as in one or more status interfaces or status views. The state of various components or elements can be monitored through user interface 603, such as processor/CPU state, network state, storage unit state, PCIe element state, among others. Various performance metrics, error statuses can be monitored using user interface 603. User interface 603 can provide other user interfaces than a GUI, such as command line interfaces (CLIs), application programming interfaces (APIs), or other interfaces. Portions of user interface 603 can be provided over a WebSocket based interface.

Storage system 612 and RAM 613 together can comprise a non-transitory data storage system, although variations are possible. Storage system 612 and RAM 613 can each comprise any storage media readable by processing circuitry 611 and capable of storing software and OS images. RAM 613 can include volatile and nonvolatile, removable and non-removable media implemented in any method or technology for storage of information, such as computer readable instructions, data structures, program modules, or other data. Storage system 612 can include non-volatile storage media, such as solid-state storage media, flash memory, phase change memory, or magnetic memory, including combinations thereof. Storage system 612 and RAM 613 can each be implemented as a single storage device but can also be implemented across multiple storage devices or sub-systems. Storage system 612 and RAM 613 can each comprise additional elements, such as controllers, capable of communicating with processing circuitry 611.

Software or data stored on or in storage system 612 or RAM 613 can comprise computer program instructions, firmware, or some other form of machine-readable processing instructions having processes that when executed a processing system direct processor 600 to operate as described herein. For example, software 620 can drive processor 600 to receive user commands to establish compute units among a plurality of disaggregated physical computing components that include CPUs, GPUs, SSDs, and NICs, among other components. Software 620 can drive processor 600 to receive and monitor telemetry data, statistical information, operational data, and other data to provide telemetry to users and alter operation of compute units according to the telemetry data, policies, or other data and criteria. Software 620 can drive processor 600 to manage cluster resources and compute unit resources, establish domain partitioning or NT partitioning among communication fabric elements, and interface with individual communication switches to control operation of such communication switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 620 illustrates a detailed view of an example configuration of RAM 613. It should be understood that different configurations are possible. System software 620 includes applications 621 and operating system (OS) 622. Software applications 623-628 each comprise executable instructions which can be executed by processor 600 for operating a computing system or cluster controller or operating other circuitry according to the operations discussed herein.

Specifically, cluster management application 623 establishes and maintains clusters and compute units among various hardware elements of a computing platform, such as seen in FIG. 1. User interface application 624 provides one or more graphical or other user interfaces for end users to administer associated clusters and compute units and monitor operations of the clusters and compute units. Job handling application 625 receives execution jobs over job interface 602, analyzes the execution jobs for scheduling/queuing along with indications of computing components needed for handling/execution of the jobs within composed compute units. Job handling application 625 also indicates job software or data needed to be deployed to composed compute units for execution of the jobs, as well as what data, status, or results are needed to be transferred over job interface 602 to originating systems for the jobs. Inter-module communication application 626 provides communication among other processor 600 elements, such as over I2C, Ethernet, emulated network devices, or PCIe interfaces. Inter-module communication application 626 enables communications between processor 600 and composed compute units, as well as other elements. User CPU interface 627 provides communication, APIs, and emulated network devices for communicating with processors of compute units, and specialized driver elements thereof. Fabric interface 628 establishes various logical partitioning or domains among communication fabric circuit elements, such as PCIe switch elements of a PCIe fabric. Fabric interface 628 also controls operation of fabric switch elements, and receives telemetry from fabric switch elements. Fabric interface 628 also establishes address traps or address redirection functions within a communication fabric. Fabric interface 628 can interface with one or more fabric switch circuitry elements to establish address ranges which are monitored and redirected, thus forming address traps in the communication fabric.

In addition to software 620, other data 630 can be stored by storage system 612 and RAM 613. Data 630 can comprise job schedule 631 (or job queue), templates 632, machine policies 633, telemetry agents 634, telemetry data 635, and fabric data 636. Job schedule 631 comprises indications of job identifiers, job resources needed for execution of the jobs, as well as various other job information. This other job information can include timestamps of receipt, execution start/end, and other information. Job schedule 631 can comprise one or more data structures which holds timewise representations of execution jobs and associated computing components needed for inclusion in compute units composed for execution/handling of the execution jobs. Templates 632 include specifications or descriptions of various hardware templates or machine templates that have been previously defined. Templates 632 can also include lists or data structures of components and component properties which can be employed in template creation or template adjustment. Machine policies 633 includes specifications or descriptions of various machine policies that have been previously defined. These machine policies specifications can include lists of criteria, triggers, thresholds, limits, or other information, as well as indications of the components or fabrics which are affected by policies. Machine policies 633 can also include lists or data structures of policy factors, criteria, triggers, thresholds, limits, or other information which can be employed in policy creation or policy adjustment. Telemetry agents 634 can include software elements which can be deployed to components in compute units for monitoring the operations of compute units. Telemetry agents 634 can include hardware/software parameters, telemetry device addressing, or other information used for interfacing with monitoring elements, such as IPMI-compliant hardware/software of compute units and communication fabrics. Telemetry data 635 comprises a data store of received data from telemetry elements of various compute units, where this received data can include telemetry data or monitored data. Telemetry data 635 can organize the data into compute unit arrangements, communication fabric arrangements or other structures. Telemetry data 635 might be cached as data 630 and subsequently transferred to other elements of a computing system or for use in presentation via user interfaces. Fabric data 636 includes information and properties of the various communication fabrics that comprise a pool of resources or pool of components, such as fabric type, protocol version, technology descriptors, header requirements, addressing information, and other data. Fabric data 636 might include relations between components and the specific fabrics through which the components connect.

Software 620 can reside in RAM 613 during execution and operation of processor 600, and can reside in non-volatile portions of storage system 612 during a powered-off state, among other locations and states. Software 620 can be loaded into RAM 613 during a startup or boot procedure as described for computer operating systems and applications. Software 620 can receive user input through user interface 603. This user input can include user commands, as well as other input, including combinations thereof.

Storage system 612 can comprise flash memory such as NAND flash or NOR flash memory, phase change memory, magnetic memory, among other solid-state storage technologies. As shown in FIG. 6, storage system 612 includes software 620. As described above, software 620 can be in a non-volatile storage space for applications and OS during a powered-down state of processor 600, among other operating software.

Processor 600 is generally intended to represent a computing system with which at least software 620 is deployed and executed in order to render or otherwise implement the operations described herein. However, processor 600 can also represent any computing system on which at least software 620 can be staged and from where software 620 can be distributed, transported, downloaded, or otherwise provided to yet another computing system for deployment and execution, or yet additional distribution.

The systems and operations discussed herein provide for dynamic assignment of computing resources (CPUs), graphics processing resources (GPUs), network resources (NICs), or storage resources (SSDs) to a computing cluster comprising compute units. The compute units are disaggregated and reside in a pool of unused, unallocated, or free components until allocated (composed) into compute units. A management processor can control composition and de-composition of the compute units and provide interfaces to external users, job management software, or orchestration software. Processing resources and other elements (graphics processing, network, storage, FPGA, or other) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources (e.g. CPUs) can have unique identifiers assigned thereto for use in identification by the management processor and for identification on the PCIe fabric. User supplied software such as operating systems and applications can be deployed to processing resources as-needed when CPUs are initialized after adding into a compute unit, and the user supplied software can be removed from CPUs when those CPUs are removed from a compute unit. The user software can be deployed from a storage system that a management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources (e.g. GPUs) or FPGA resources can be shared among more than one compute unit of a cluster using NT partitioning or domain-based partitioning over the PCIe fabric and PCIe switches.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method comprising:
receiving execution jobs directed to a computing cluster comprising a pool of computing components coupled to at least a communication fabric;
based on properties of the execution jobs, determining resource scheduling for handling the execution jobs, the resource scheduling indicating timewise allocations of resources of the computing cluster;
initiating the execution jobs on the computing cluster according to the resource scheduling by at least instructing the communication fabric to compose compute units comprising sets of computing components selected from among the pool of computing components to handle the execution jobs, wherein responsive to completions of the execution jobs, the compute units are decomposed back into the pool of computing components.

2. The method of claim 1, further comprising:
in accordance with the resource scheduling, instructing the communication fabric to deploy software components to the compute units for running the execution jobs once each of the compute units are formed.

3. The method of claim 1, further comprising:
responsive to the completions of the execution jobs, instructing the communication fabric to decompose the compute units by removing a corresponding logical isolation for the compute units such that computing components of the compute units are made available for composition into additional compute units.

4. The method of claim 1, wherein the resource scheduling comprises one or more data structures relating identifiers for the execution jobs, indications of the sets of computing components needed to run each of the execution jobs, timeframes to initiate composition and decomposition of the compute units, and indications of software components to deploy to the compute units for the execution jobs.

5. The method of claim 1, wherein the pool of computing components comprises central processing units (CPUs), co-processing units, graphics processing units (GPUs), tensor processing units (TPUs), field programmable gate arrays (FPGAs), application specific integrated circuits (ASICs), storage drives, and network interface controllers (NICs) coupled to at least the communication fabric.

6. The method of claim 5, wherein the pool of computing components comprise computing components coupled to more than one communication fabric each comprising a different communication protocol.

7. The method of claim 1, wherein the communication fabric comprises communication protocols from at least one among Peripheral Component Interconnect Express (PCIe), Gen-Z, Compute Express Link (CXL), NVLink, Cache Coherent Interconnect for Accelerators (CCIX), Open Coherent Accelerator Processor Interface (OpenCAPI), Ethernet, and InfiniBand, and FibreChannel.

8. The method of claim 1, wherein instructing the communication fabric to compose the compute units comprises instructing the communication fabric to form logical isolations within the communication fabric communicatively coupling the sets of computing components, and wherein the logical isolations each allow computing components within each of the sets of computing components to communicate over the communication fabric only within corresponding logical isolations.

9. An apparatus, comprising:
one or more computer readable storage media;
a processing system operatively coupled with the one or more computer readable storage media; and
program instructions stored on the one or more computer readable storage media that, based on being read and executed by the processing system, direct the processing system to at least:
receive execution jobs directed to a computing cluster comprising a pool of computing components coupled to at least a communication fabric;
based on properties of the execution jobs, determine resource scheduling for handling the execution jobs, the resource scheduling indicating timewise allocations of resources of the computing cluster;
initiate the execution jobs on the computing cluster according to the resource scheduling by at least instructing the communication fabric to compose compute units comprising sets of computing components selected from among the pool of computing components to handle the execution jobs, wherein responsive to completions of the execution jobs, the compute units are decomposed back into the pool of computing components.

10. The apparatus of claim 9, comprising further program instructions, based on being executed by the processing system, direct the processing system to at least:
in accordance with the resource scheduling, instruct the communication fabric to deploy software components to the compute units for running the execution jobs once each of the compute units are formed.

11. The apparatus of claim 9, comprising further program instructions, based on being executed by the processing system, direct the processing system to at least:
responsive to the completions of the execution jobs, instruct the communication fabric to decompose the compute units by removing a corresponding logical isolation for the compute units such that computing components of the compute units are made available for composition into additional compute units.

12. The apparatus of claim 9, wherein the resource scheduling comprises one or more data structures relating identifiers for the execution jobs, indications of the sets of computing components needed to run each of the execution jobs, timeframes to initiate composition and decomposition of the compute units, and indications of software components to deploy to the compute units for the execution jobs.

13. The apparatus of claim 9, wherein the pool of computing components comprises central processing units (CPUs), co-processing units, graphics processing units (GPUs), tensor processing units (TPUs), field programmable gate arrays (FPGAs), application specific integrated circuits (ASICs), storage drives, and network interface controllers (NICs) coupled to at least the communication fabric.

14. The apparatus of claim 13, wherein the pool of computing components comprise computing components coupled to more than one communication fabric each comprising a different communication protocol.

15. The apparatus of claim 9, wherein the communication fabric comprises communication protocols from at least one among Peripheral Component Interconnect Express (PCIe), Gen-Z, Compute Express Link (CXL), NVLink, Cache Coherent Interconnect for Accelerators (CCIX), Open Coherent Accelerator Processor Interface (OpenCAPI), Ethernet, and InfiniBand, and FibreChannel.

16. The apparatus of claim 9, comprising further program instructions, based on being executed by the processing system, direct the processing system to at least:
instruct the communication fabric to compose the compute units by at least instructing the communication fabric to form logical isolations within the communication fabric communicatively coupling the sets of computing components, wherein the logical isolations each allow computing components within each of the sets of computing components to communicate over the communication fabric only within corresponding logical isolations.

17. A computing system, comprising:
a job interface configured to receive execution jobs for handling by the computing system;
a management processor configured to:
form a free pool of computing components coupled to at least a communication fabric;
based on properties of the execution jobs, determine resource scheduling for handling the execution jobs, the resource scheduling indicating timewise allocations of resources from the free pool of computing components;
initiate the execution jobs according to the resource scheduling by at least composing compute units comprising sets of computing components selected from among the pool of computing components to handle the execution jobs;
in accordance with the resource scheduling, deploy software components to the compute units for running the execution jobs once each of the compute units are formed; and
responsive to completions of the execution jobs, decompose the compute units by removing a corresponding logical isolation for the compute units such that computing components of the compute units are made available for composition into additional compute units.

18. The computing system of claim 17, wherein the resource scheduling comprises one or more data structures relating identifiers for the execution jobs, indications of the sets of computing components needed to run each of the execution jobs, timeframes to initiate composition and decomposition of the compute units, and indications of software components to deploy to the compute units for the execution jobs.

19. The computing system of claim 17, comprising:
the management processor configured to compose the compute units by at least forming logical isolations within the communication fabric communicatively coupling the sets of computing components, wherein the logical isolations each allow computing components within each of the sets of computing components to communicate over the communication fabric only within corresponding logical isolations.

20. The computing system of claim 17, wherein the pool of computing components comprises central processing units (CPUs), co-processing units, graphics processing units (GPUs), tensor processing units (TPUs), field programmable gate arrays (FPGAs), application specific integrated circuits (ASICs), storage drives, and network interface controllers (NICs) coupled to at least the communication fabric.

* * * * *